United States Patent [19]
Champion et al.

[11] 3,858,161
[45] Dec. 31, 1974

[54] BOX FOR ELECTRICAL CONNECTIONS

[75] Inventors: Mary J. Champion; Clarence C. Pottle; Joseph H. Gerber, all of Brooklyn, N.Y.

[73] Assignee: The Raymond Lee Organization, New York, N.Y. ; a part interest

[22] Filed: Aug. 8, 1973

[21] Appl. No.: 386,767

[52] U.S. Cl. .............................. 339/122 R, 174/53
[51] Int. Cl. .......................................... H01r 15/18
[58] Field of Search ............ 339/32, 122, 263, 176; 174/53, 58, 59

[56] References Cited
UNITED STATES PATENTS
2,039,336  5/1936  Niesen .......................... 339/122 X
2,248,759  7/1941  Hollander ................... 339/122 R X Primary Examiner—Richard E. Moore
Attorney, Agent, or Firm—Daniel Jay Tick

[57] ABSTRACT

A box for electrical connections for electrically connecting wall type units to a power source comprises a standard electrical connection box having a pair of opposite spaced substantially parallel sides. Electrical contacts are mounted on the pair of sides in the box and comprise resilient contact members for releasably contacting electrical wall type units moved into the box. The electrical contacts are electrically connected to a source of power.

2 Claims, 6 Drawing Figures

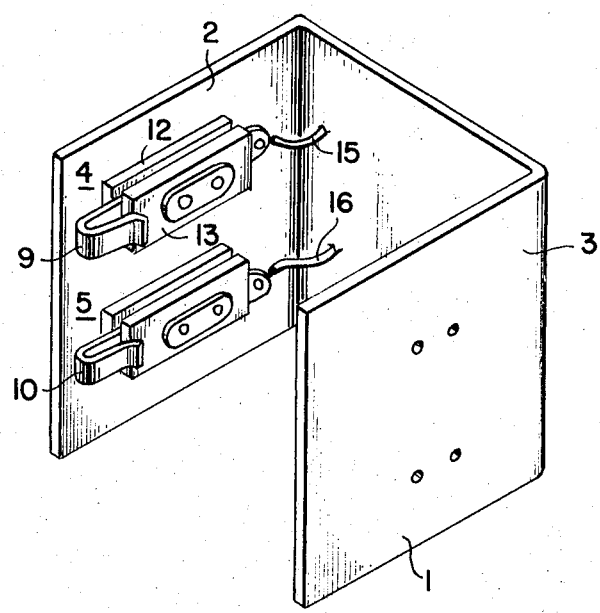
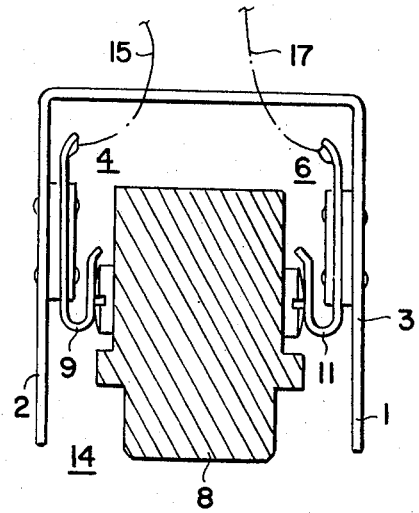
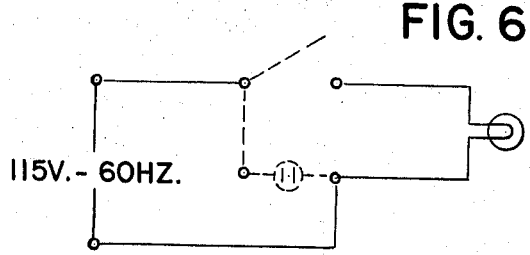
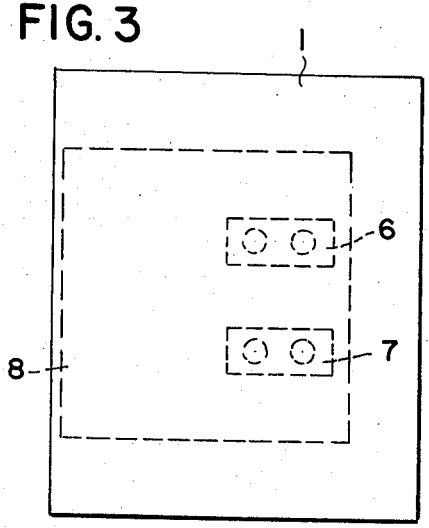
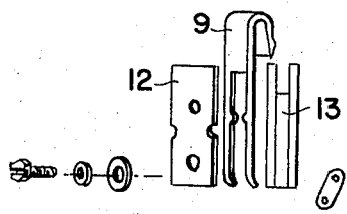
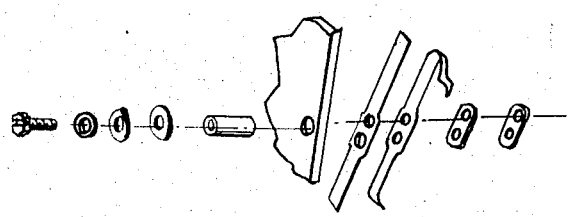

BOX FOR ELECTRICAL CONNECTIONS

DESCRIPTION OF THE INVENTION

The present invention relates to a box for electrical connections. More particularly, the invention relates to a box for electrical connections for electrically connecting wall type units to a power source.

The principal object of the invention is to provide a box for electrical connections, which box electrically connects wall-type units to a power source without the need for connecting electrical conductors to such wall-type units.

Another object of the invention is to provide a box for electrical connections for electrically connecting wall type units such as, for example, outlets or receptacles, to a power source, which box is of simple structure, efficient, effective, reliable and safe in operation, and easy, simple, and convenient to use.

In order that the invention may be readily carried into effect, it will now be described with reference to the accompanying drawings, wherein:

FIG. 1 is a schematic diagram of an embodiment of a box of the present invention for electrical connections;

FIG. 2 is a top view, partly in section, of a wall type unit electrically connected to a power source via the box of the invention for electrical connections;

FIG. 3 is a side view of the box of the invention with a wall type unit electrically connected therein;

FIG. 4 is an exploded view of parts of an embodiment of an electrical contact of the box of the invention for electrical connections;

FIG. 5 is an exploded view of another embodiment of an electrical contact of the box of the invention for electrical connections; and FIG. 6 is a circuit diagram for the connection of the box of the invention for electrical connections.

In the FIGS., the same components are identified by the same reference numerals.

The box for electrical connections of the invention electrically connects wall type units such as, for example, receptacles or outlets, to a power source.

The box of the invention comprises a standard electrical connection box 1 (FIGS. 1, 2 and 3) having a pair of opposite spaced substantially parallel sides 2 and 3 (FIGS. 1 and 2).

A pair of electrical contacts 4 and 5 are mounted on the side 2 in the box 1. A pair of electrical contacts 6 and 7 are mounted on the side 3 in the box 1. FIG. 1 shows the contacts 4 and 5. The contact 6 is shown in FIG. 2, whereas the contact 7 is not shown in the FIGS. Each electrical contact comprises a resilient contact member for releasably contacting an electrical wall type unit 8 comprising, for example, an outlet or receptacle, and shown in FIG. 2.

The electrical contact 4 thus has a contact member 9, the electrical contact 5 has a contact member 10 and the electrical contact 6 has a contact member 11 (FIGS. 1 and 2).

Each electrical contact comprises a first member 12 of electrically insulating material adjacent the box, as shown in FIGS. 1 and 5 for the electrical contact 4. The spring-like electrical contact 9 is adjacent the first member 12. A second member 13 of electrically insulating material is adjacent the contact member 9, thereby sandwiching the electrical contact member between the first and second insulating members, as shown in FIGS. 1 and 5. Each of the electrical contact members 9, 10, 11 and so on, is substantially U-shaped at its end adjacent the opening 14 (FIG. 2) of the box. The opening 14 is for accommodating wall-type units such as the unit 8.

The electrical contacts 4, 5, 6 and 7, and more specifically, the contact members 9, 10, 11, and so on, thereof, are electrically connected by electrical conductors 15, 16, 17, and so on (FIGS. 1 and 2), to a source of power (not shown in the FIGS.).

While the invention has been described by means of a specific example and in a specific embodiment, I do not wish to be limited thereto, for obvious modifications will occur to those skilled in the art without departing from the spirit and scope of the invention.

I claim:

1. A box for electrical connections for electrically connecting wall type units to a power source, comprising an electrical connection box having a pair of opposite spaced substantially parallel sides;

electrical contact means mounted on the pair of sides in the box for releasably contacting electrical wall type units moved into the box, the electrical contact means comprising a plurality of contact units each having a first member of electrically insulating material adjacent the box, a spring-like electrical contact member adjacent the first member and a second member of electrically insulating material adjacent the contact member thereby sandwiching the electrical contact member between the first and second insulating members; and electrical connecting means electrically connecting the electrical contact means to a source of power.

2. A box for electrical connections as claimed in claim 1, wherein the box has an opening for accommodating wall type units and each of the electrical contact members is substantially U-shaped at its end adjacent the opening.

* * * * *